(12) United States Patent  (10) Patent No.: US 6,172,736 B1
Yamamoto                   (45) Date of Patent:     Jan. 9, 2001

(54) PHOTOGRAPHIC PROCESS AND PRINTER PROCESSOR (75) Inventor: Hiroyasu Yamamoto, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/273,729

(22) Filed: Mar. 22, 1999

(30) Foreign Application Priority Data

Mar. 25, 1998 (JP) .................................................. 10-077887
Mar. 12, 1999 (JP) .................................................. 11-066212

(51) Int. Cl.[7] ............................ G03B 27/52; G03B 29/00
(52) U.S. Cl. ................................ 355/28; 355/41; 355/72; 396/613
(58) Field of Search ................................ 355/27, 28, 29, 355/72, 41, 40; 396/612, 613, 615, 617, 620, 622

(56) References Cited

U.S. PATENT DOCUMENTS 5,438,388 * 8/1995 Arimoto et al. ........................ 355/28
5,678,111 * 10/1997 Matsumoto ........................... 396/564
5,929,975 * 7/1999 Matsumoto ........................... 355/28
5,934,167 * 8/1999 Yamamoto ............................ 355/72

* cited by examiner

Primary Examiner—Alan A. Mathews
(74) Attorney, Agent, or Firm—Sughrue, Mion, Zinn, Macpeak & Seas, PLLC (57) ABSTRACT A photographic processing method and a printer processor in which the length of a developing path can be shortened and the size of the apparatus can also be reduced without reducing the processing capacity is provided. Since the direction in which printing paper is transported is changed during processing, that is exposure is performed while the printing paper is transported in the longitudinal direction thereof; thereafter the transport direction in which the printing paper is transported is changed and developing processing is performed; and thereafter the direction in which the printing paper is transported is restored to the longitudinal direction thereof, the degree of freedom in designing is increased and the space for installing the apparatus can be saved. Moreover, since the printing paper is cut into groups of a plurality of image frames and developing processing is performed while the printing paper is being transported in the direction of the shorter side thereof, the processing time required for a predetermined processing amount can be shortened and the size of the processing tanks for developing, fixing, washing, and the like can be reduced. As a result, the entire apparatus can be constructed in a smaller size.

8 Claims, 8 Drawing Sheets

DISTANCE BETWEEN THE
SENSOR AND THE CUTTER: L1

(IN CASE OF L1 IS
EQUAL TO L2, THE
CUTTER IS ACTIVA-
TED SIMULTANEOUSly
WITH THE DETECTION
OF THE PRELIMINARY
CUT MARK.)

DISTANCE BETWEEN THE
PRELIMINARY CUT MARK
AND THE CUTTING
POSITION: L2

FIG. 8B (IN CASE OF L1 IS
NOT EQUAL TO L2,
THE CUTTER IS
ACTIVATED AFTER
$\Delta L / \mu = t$ SECONDS
FROM THE DETECTION
OF THE PRELIMINARY
CUT MARK, HERE
$\mu$ = THE CONSTANT
TRANSPORT VELOCITY.)

PHOTOGRAPHIC PROCESS AND PRINTER PROCESSOR

BACKGROUND OF THE INVENTION

1. Field of the Invention

The present invention relates to a photographic processing method and a printer processor in which an elongated photosensitive material is sequentially exposed to images, subjected to development, and thereafter cut into images according to main cut marks provided at the boundary between each exposure area during imagewise exposure to obtain photographic prints.

2. Description of Related Art

Generally, in a printer processor, an elongated photosensitive material (printing paper) is wound into a roll and accommodated in a magazine, and the magazine is loaded in a predetermined position.

Here, when a printing paper is subjected to print exposure of an image which has been recorded on a photographed film in a full-image exposure method, the photographed film is set in a carrier; printing paper is taken out from the magazine and transported and guided to a print exposure position; in the print exposure position, a mask is applied to the printing paper according to the predetermined print size or the like; thereafter a shutter is opened; and transmitted light is irradiated through the photographed film onto the printing paper thereby exposing the printing paper imagewise.

Exposed printing paper is sequentially positioned in a print exposure position and sequentially developed while being transported in an unchanging direction.

At the boundaries between exposed image areas on the printing paper, cut marks are provided. The cut marks are detected and the printing paper is cut at each cut mark to produce a photographic print.

In a conventional printer processor, a photosensitive material taken out from a magazine is always transported along its longitudinal direction, and hence the path length from print exposure to development is very long. Therefore, the physical size of the processor has had to be large and there has been an unsatisfied demand for downsizing without any reduction in processing capacity.

This problem may be solved simply by shortening the path length of the development process, that is development, fixation, washing, drying and the like.

If the transporting speed of the printing paper is slowed down, the path length of the developing process can be shortened, however, the processing capacity is reduced and therefore this is not preferable.

Since even if a unit area (that is, the area processed at one time), is increased, the processing time does not change but the processing quality deteriorates, it is conceivable that parallel processing can compensate for the drawbacks due to the short path length, but the required mechanism for parallel processing is complex and therefore no contribution to downsizing can be expected in many cases.

The present invention has been made in light of the above facts and it is accordingly an object of the present invention to provide a photographic processing method and a printer processor in which a reduced size is achieved without any reduction in processing capacity being suffered by shortening the path length of the development process.

SUMMARY OF THE INVENTION

According to the first aspect of the present invention, there is provided a photographic processing method for obtaining photographic prints by sequentially exposing predetermined images onto an elongated photosensitive material, performing developing processing on the photosensitive material, and then cutting the photosensitive material between each image, wherein the photosensitive material is exposed while being transported in a longitudinal direction at the time of image exposure, the photosensitive material is cut into a plurality of image area units, and then the photosensitive material is transported in a transverse direction at the time of developing processing.

According to the second aspect of the present invention, in the first aspect of the present invention, each of the image area units is a single image unit.

According to the third aspect of the present invention, in the first aspect of the present invention, each of the image area units is a plurality of image units.

According to the fourth aspect of the present invention, in the first aspect of the present invention, cutting of the photosensitive material into said image area units is conducted prior to exposure.

According to the fifth aspect of the present invention, in the first aspect of the present invention, cutting of the photosensitive material into said image area units is conducted after exposure.

According to the first aspect of the present invention, the direction in which the printing paper is transported at the time of print exposure and the direction in which the printing paper is transported at the time of development intersect each other orthogonally and, at the time of developing, development processing is performed in a condition where a plurality of images remain on one sheet of printing paper. Accordingly, the same effect as parallel processing can be achieved in the development processing and, since one sheet of photosensitive material is used, the transport system can be uncomplicated.

As can be seen from the above, the degree of freedom in handling of photosensitive material is increased (since there is not only one transport direction available), and at the same time the size of the apparatus can be reduced without any reduction in processing capacity.

Here, according to the second and third aspects of the present invention, the image area unit may be either of a single image unit or a plurality of image units. For example, when various sizes of images are recorded on the photosensitive material and cutting is conducted based on the longest length of the sizes, it is advantageous in terms of easy handling of the photosensitive material to cut images of a smaller size as two or more images units. On the other hand, when only images of the same size are recorded, cutting may be conducted as a single image unit.

Further, according to the second and third aspects of the present invention, cutting in the image area unit may be conducted either prior to or after exposure.

According to the sixth aspect of the present invention, there is provided a photographic processing method for obtaining photographic prints by sequentially exposing a predetermined image onto an elongated photosensitive material, performing developing processing on the photosensitive material, and then cutting the photosensitive material after each image on the basis of main cut marks provided at the boundaries of exposure areas during image exposures, wherein: a photosensitive material is exposed while being transported in an elongated state in the longitudinal direction thereof; preliminary cut marks are imparted to the boundaries of image areas in such a way that the image exposure area is kept inside a predetermined length in the longitudinal direction, with the length of the exposed image area in the direction in which the photosensitive material is transported taken as one unit, at the time of this exposure; the exposed photosensitive material is cut at each of the preliminary cut marks; the direction in which each cut photosensitive material is being transported is changed to the transverse direction of the cut photosensitive material, developing processing is performed on the cut photosensitive material while the cut photosensitive material is being transported in this state; and the processed photosensitive material is then cut at each main cut mark.

According to the seventh aspect of the present invention, there is provided a print processor for obtaining photographic prints by sequentially exposing a predetermined image onto an elongated photosensitive material, performing developing processing on the photosensitive material, and then cutting the photosensitive material after each image on the basis of main cut marks provided at the boundaries of exposure areas during image exposures comprising: preliminary cut mark imparting means for imparting preliminary cut marks to the boundaries of image areas in such a way that the image exposure area is kept inside a predetermined length in the longitudinal direction, with the length of the exposed image area in the direction in which the photosensitive material is transported taken as one unit, at the time the image is exposed onto the photosensitive material; preliminary cut mark detecting means for detecting, on a photosensitive material having completed image exposure, preliminary cut marks imparted by the preliminary cut mark imparting means; cutting means for cutting a photosensitive material in a location where preliminary cut marks have been detected by the preliminary cut mark detecting means; direction changing means for changing the direction in which the photosensitive material is being transported to the transverse direction of the photosensitive material after the photosensitive material has been cut by the cutting means; and a developing processing section for performing developing processing on the photosensitive material while transporting the photosensitive material in the direction set by the direction changing means.

According to the sixth and seventh aspect of the present invention, when an elongated photosensitive material is exposed while being transported in the longitudinal direction thereof, preliminary cut marks are imparted to the boundaries of image areas in such a way that the image exposure area is kept inside a predetermined length in the longitudinal direction, with the length of the exposed image area in the direction in which the photosensitive material is transported taken as one unit, at the time the image is exposed onto the photosensitive material (by the preliminary cut mark imparting means). The preliminary cut marks are different from the main cut marks and are not provided at the boundaries between each image area, but, if, for example, there are images of the same size on a photosensitive material, preliminary cut marks are provided after each plurality of images.

When a preliminary cut mark is detected (by the preliminary cut mark detection means), the photosensitive material is cut at the preliminary cut mark location (by the cutting means).

The direction in which the cut photosensitive material is transported is changed to the transverse direction thereof from the longitudinal direction in which photosensitive material was transported during exposure(by the direction changing means). Development processing is performed while the photosensitive material is being transported in the new direction. Although the photosensitive material is a single sheet, an equal effect to parallel processing of plural images can be obtained. In this case, however, the apparatus does not require any further complexity in its structure since the transporting system is the same as a single-sheet transporting system.

The photosensitive material which has been developed as described above is further cut according to the main cut marks into individual images, whereby photographic prints are completed.

In such a way, the transporting direction is changed and thereby the degree of freedom in handling of the photosensitive material can be increased. In this case, since development is essentially effected in the form of parallel processing, a processing capacity is not reduced even though the developing processing path length is shorter.

The main cut marks and the preliminary cut marks need not be located at positions where cutting is indeed conducted. There may be an offset distance between the cut mark position and the position where cutting is conducted. In this case, cutting is conducted after a predetermined amount of the photosensitive material is transported, or after a predetermined amount of time.

DETAILED DESCRIPTION OF PREFERRED EMBODIMENTS

Figure 1:
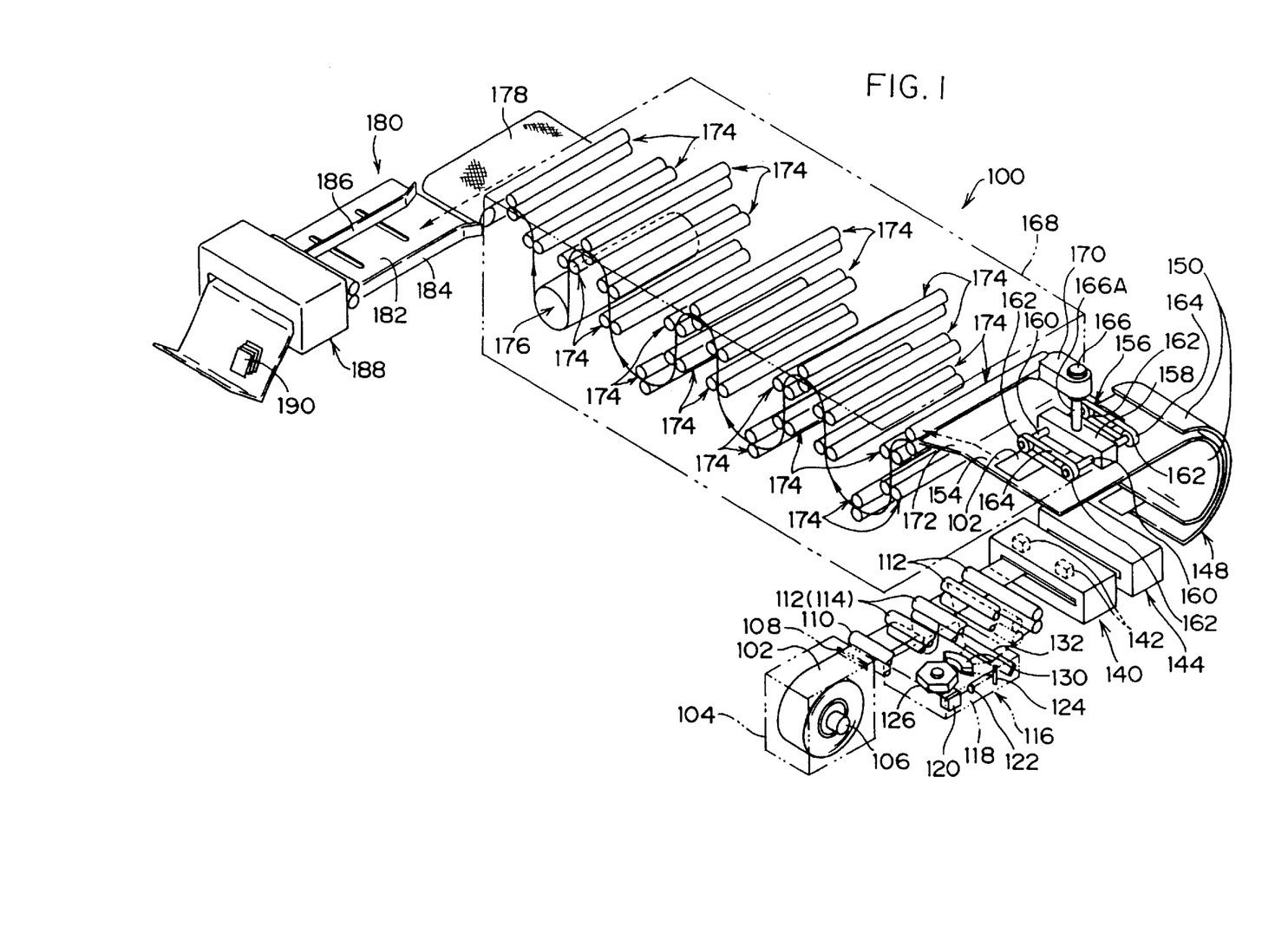
FIG. 1 is a perspective view of a schematic construction of a printer processor pertaining to the present embodiment.

In FIG. 1, a printer processor 100 pertaining to the present embodiment is shown.

A magazine 104, in which printing paper 102 is accommodated, is loaded into the processor 100.

The printing paper 102 is wound round a roll-shaped rotary shaft 106, the outermost layer of printing paper 102 is taken out from a take-out port 108 of the magazine 104 and is nipped between a pair of magazine system transporting rollers 110. The magazine system transporting rollers 110 are rotated by the driving force of an unillustrated drive means and thereby the printing paper 102 is successively taken out from the magazine 104.

As for the printing paper, there are a plurality of different kinds and classification of printing papers which are selected according to various criteria such as size, surface finish condition, sensitivity and the like. The main sizes necessary for the present embodiment are classified into the printing paper 102 as follows:

1) printing paper with a width size which matches the shorter side length 89 mm of an L size;
2) printing paper with a width size which matches the longer side length 127 mm of an L size;
3) printing paper with a width which matches the shorter side length of an L size and with a length which is twice the longer side length of an L size: (panorama size); and
4) others of a large size, such as, for example, cabinet size, a 20.3×25.4 cm² size (divided-into-six-equal parts or a one-sixth size) and the like.

In the print processor 100 of the present embodiment, as is shown in FIG. 1, when size 1) is transported, a space half of the full size in the transverse direction of the transporting system is left unused. However, this is because the width size of the transport system is determined in such a manner that printing paper of a plurality of sizes such as the above named 1) to 4) can be processed.

Figure 2:
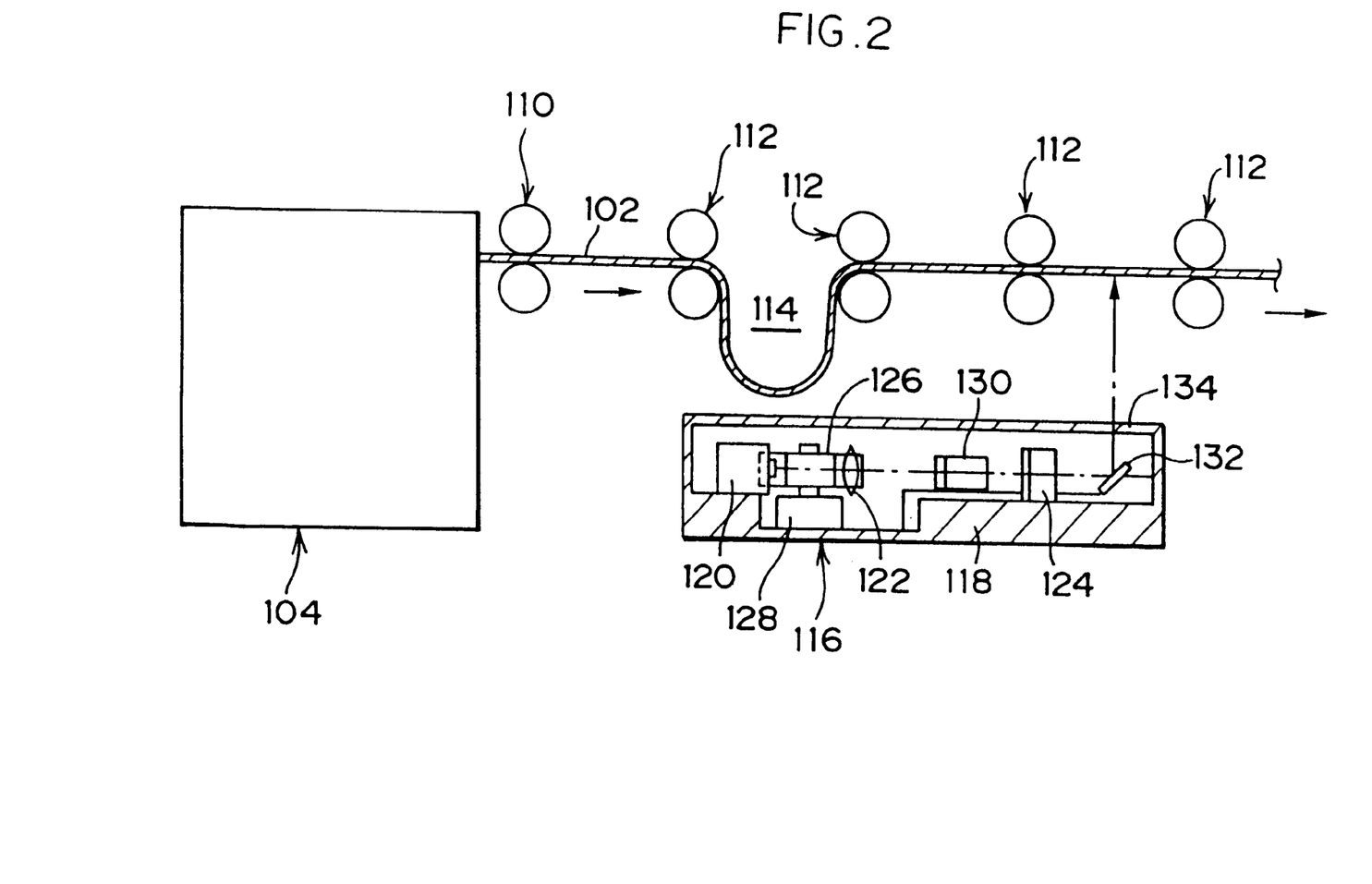
FIG. 2 is a schematic view showing an exposure section of the printer processor shown in FIG. 1.

As shown in FIG. 2, a plurality of exposure system transport roller pairs 112 are provided downstream from the pair of magazine system rollers 110. A buffer portion 114 is formed between the pair of exposure system transporting rollers 112 closest to the magazine 104 and the pair of exposure system transporting rollers 112 next closest to the magazine 104 and the printing paper 102 hangs loosely in a substantial U shape between these two pairs of exposure system transporting rollers 112. This looseness plays a role in absorbing speed differences between the extraction speed of the printing paper 102 from the magazine 104 and the transporting speed of the printing paper 102 when being exposed in an exposure section 116, later described.

Two pairs of exposure system transport rollers 112 are further provided downstream side from the buffer section 114. The region between these transport roller pairs 112 is the scanning region of a laser beam which is emitted from the exposure section 116.

Namely, the exposure section 116 of the present embodiment employs a scanning exposure type, whereby images are produced while the laser beam is swung in a main scanning direction and the printing paper is transported along the sub-scanning direction.

A plurality of optical members are accommodated in a casing 118 of the exposure section 116. The laser beam is emitted from the laser unit 120. Three unillustrated lasers emitting beams in CMY are provided in the laser unit 120, and the three laser beams are multiplexed by a dichroic mirror or the like and emitted as a single beam.

The beam emitted from the laser unit 120 is projected onto the reflective surfaces of a polygon mirror 126 via an optical system including a collimator lens 122, a reflecting mirror 124 and the like.

The polygon mirror 126 is rotated at a high speed by the driving force of a motor 128 and with the rotation, an incident beam is swung in the main scanning direction by the reflective surfaces of the polygon mirror. The beam thus swung in the main scanning direction is output from an output port 134 formed in the casing 118 via an optical system comprising an f$^\theta$ lens 130, a reflecting mirror 132 and the like and is irradiated onto an emulsion side (the lower side in FIG. 2) of the printing paper 102. At this point, in the exposure system 116, image data which is stored in a frame memory of an unillustrated controller is read, and while the output intensity from the laser is controlled (either by current control or pulse width control), the printing paper 102 is transported at a constant speed, so that images (latent images) are recorded thereon.

Figure 3A:
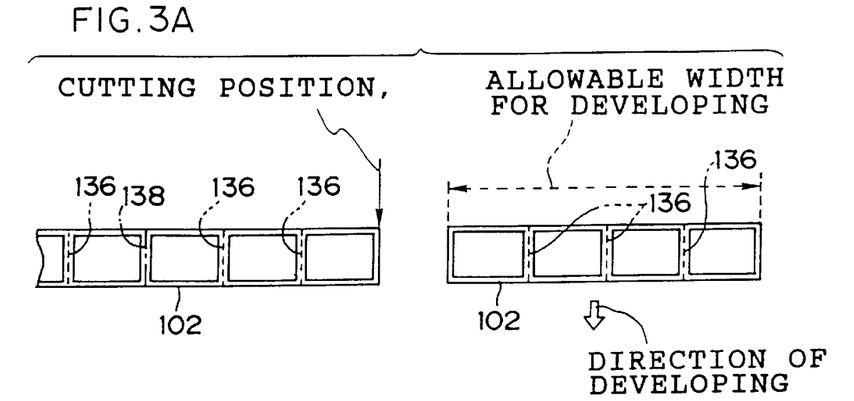
FIGS. 3A to 3C are plan views showing states where printing paper is being transported.
Figure 3B:
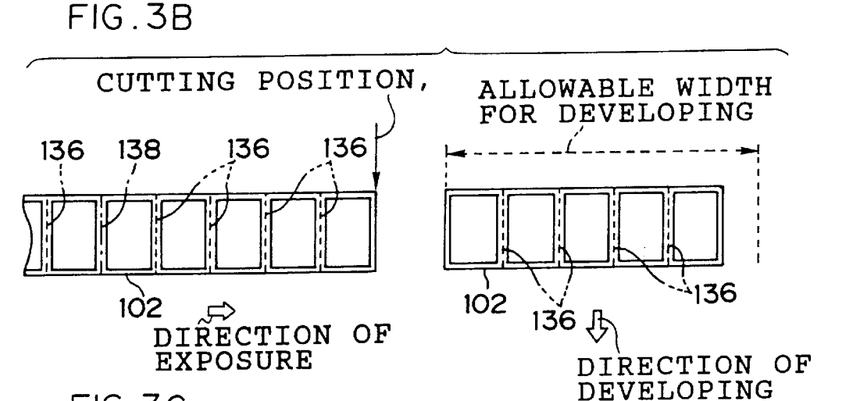

As shown in FIGS. 3A to 3B, in the printer processor 100 according to the present embodiment, the print size of an image to be recorded on the printing paper 102 is recognized in advance and main cut marks 136 which are integrated with the image data are imparted at the boundary between each image. Preliminary cut marks 138, different from the main cut marks 136, which are also integrated with the image data are imparted after every plurality of image areas.

The preliminary cut marks 138 indicate a unit length in the longitudinal direction of the photosensitive material which is subjected to a single development processing. The unit length is determined according to the developing width of a developing device later described.

Here, as an example, when the sizes of all the images are the same, as shown in FIG. 3A, and the length in the longitudinal direction of three sheets of printing paper 102 is taken as a unit development processing length, the preliminary cut marks 138 are imparted to the printing paper 102 in such a manner that the preliminary cut marks 138 are imparted after every three image areas.

At this point, since transportation of the printing paper 102 in the exposure section 116 is effected at a constant speed, the constant speed transportation can be effected, with good accuracy, by having a necessary length of the printing paper 102 in stock in the buffer section 114 in advance, so that recording of latent images by the scanning can be conducted with certainty.

Figure 4:
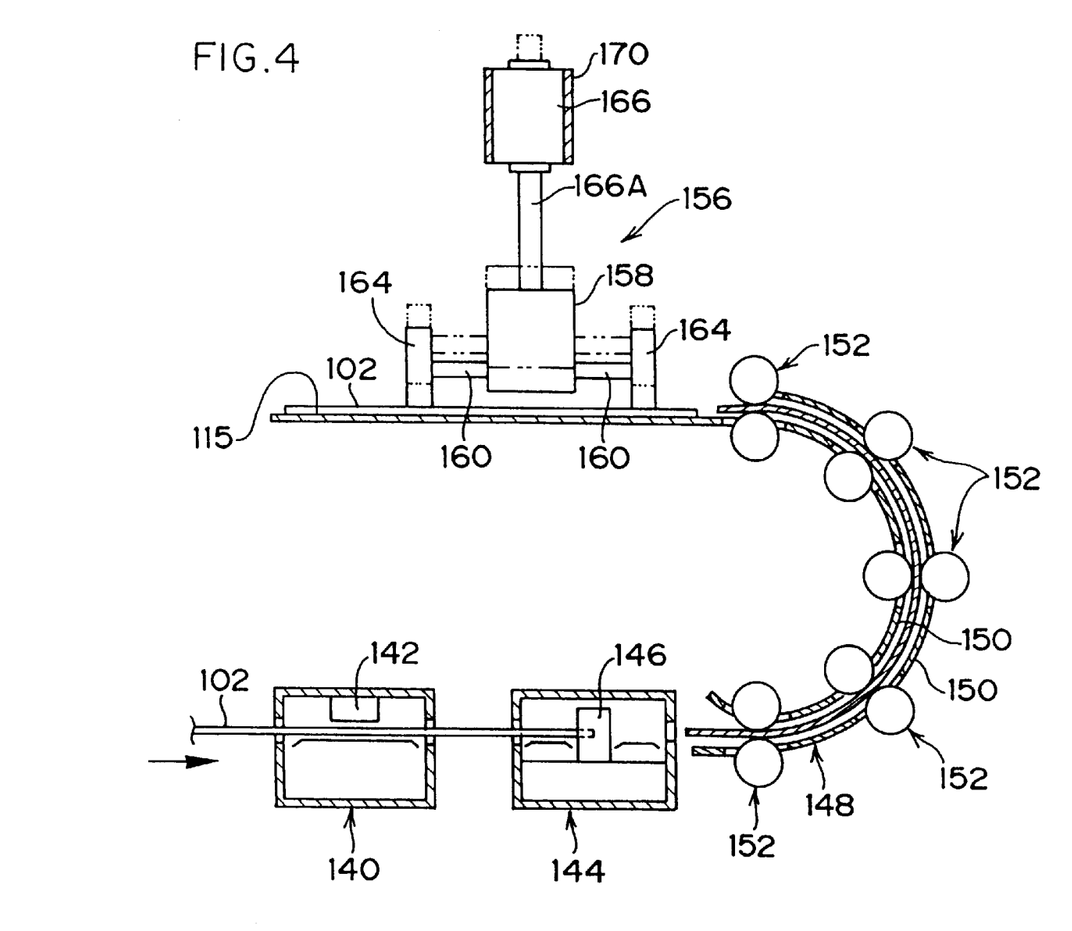
FIG. 4 is a schematic view showing a cutting/direction changing section of the printer processor shown in FIG. 1.

A detection unit 140 for detecting preliminary cut marks 138 is provided downstream from the exposure section 116, as shown in FIG. 4. The detection unit 140 comprises a preliminary cut mark sensor 142 and a detection face of the detection unit 140 faces the transport passage of the printing paper 102. Hence, when the printing paper 102 passes the detection unit 140, it can be detected by the preliminary cut mark sensor 142 whether or not preliminary cut marks 138 are attached.

Two preliminary cut mark sensors 142 are disposed along the transverse direction of the printing paper 102, so that the sensors 142 are able to detect preliminary cut marks in printing papers 102 having different widths. In this case, it is possible that both or any of the two preliminary cut mark sensors 142 can be designed to be movable in the transverse direction of the printing paper 102, and in addition, it is also possible for only one preliminary cut mark sensor 142 to be provided so that it is movable in the transverse direction of the printing paper 102.

A cutter unit 144 for cutting the photosensitive material at a position offset by a predetermined interval from a detection point of the preliminary cut mark sensor 142 is disposed downstream of the detection unit 140. The cutter 146 is provided in the cutter unit 144.

When the printing paper 102 is transported at a constant speed from the detection unit 140 to the cutter unit 104, the time required for transporting the printing paper 102 over the offset interval can be known in advance. Accordingly, the cutter unit 146 is activated after a predetermined time has elapsed from the detection of a preliminary cut mark 138 in the detection unit 140 and thereby the printing paper 102 can correctly be cut at the preliminary cut mark position.

Figure 8A:
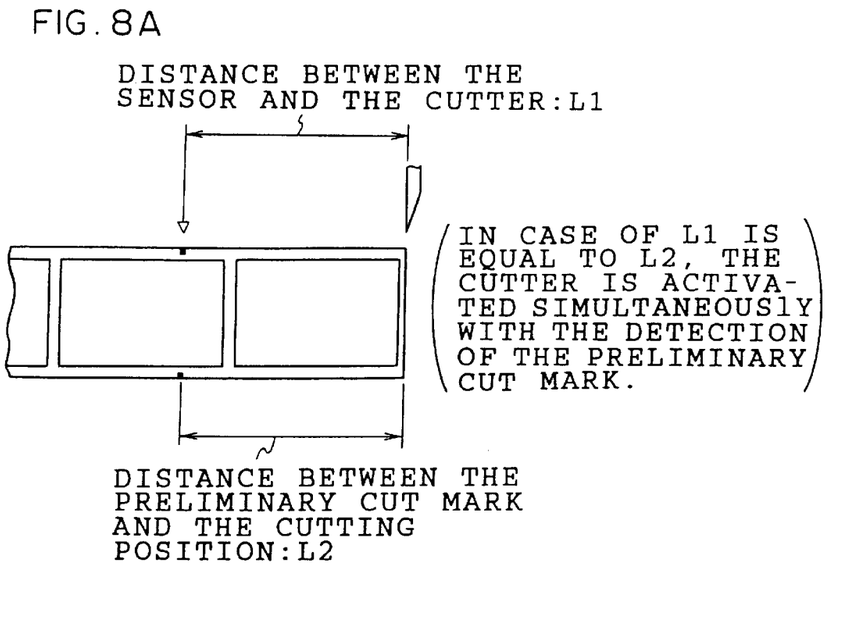
FIGS. 8A and 8B are plan views showing a relation between a preliminary cut mark and a cutting position.
Figure 8B:
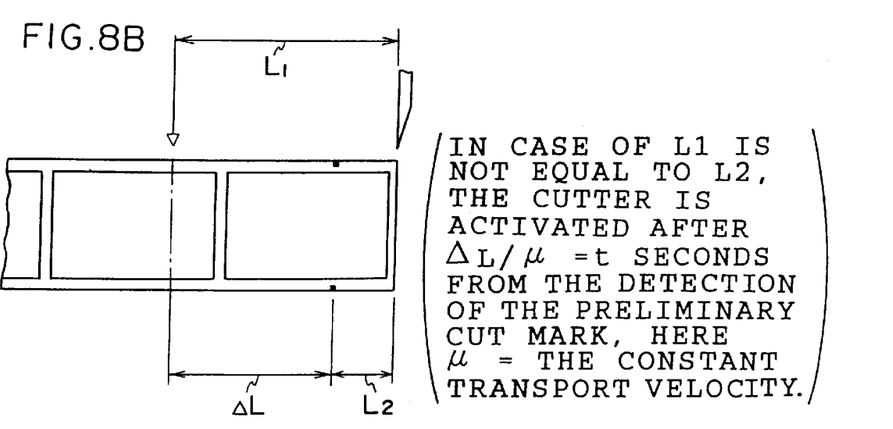

A preliminary cut mark 138 may be imported in an offset manner from the actual cut position in advance and cutting may thus be effected at the same time as the detection. This means that the preliminary cut marks 138 need not be made at the positions where cutting of the photosensitive material is actually conducted. The preliminary cut marks may be made at a position that is separated from the cutting positions by the distance between the preliminary mark sensor 142 and the cutter 146 of the cutter unit 144, as shown in Fig.8A. In this case, cutting operation can be activated on detecting the preliminary mark 138.

A printing paper reversing section 148 is provided downstream from the cutter unit 146. The printing paper reversing section 148 is constructed from a pair of guide plates 150 having a semicircular shape and a gap of a predetermined size is formed between the guide plates 150. Reversing system transport roller pairs 152 are provided at a plurality of positions on the pair of guide plates 150 and provide transporting force to the printing paper 102 as it passes between the pair of guide plates 150. As a result, the printing paper 102 cut in the cutter unit 144 passes through a pair of guide plates 150 and is discharged on a development section tray 115.

Figure 5:
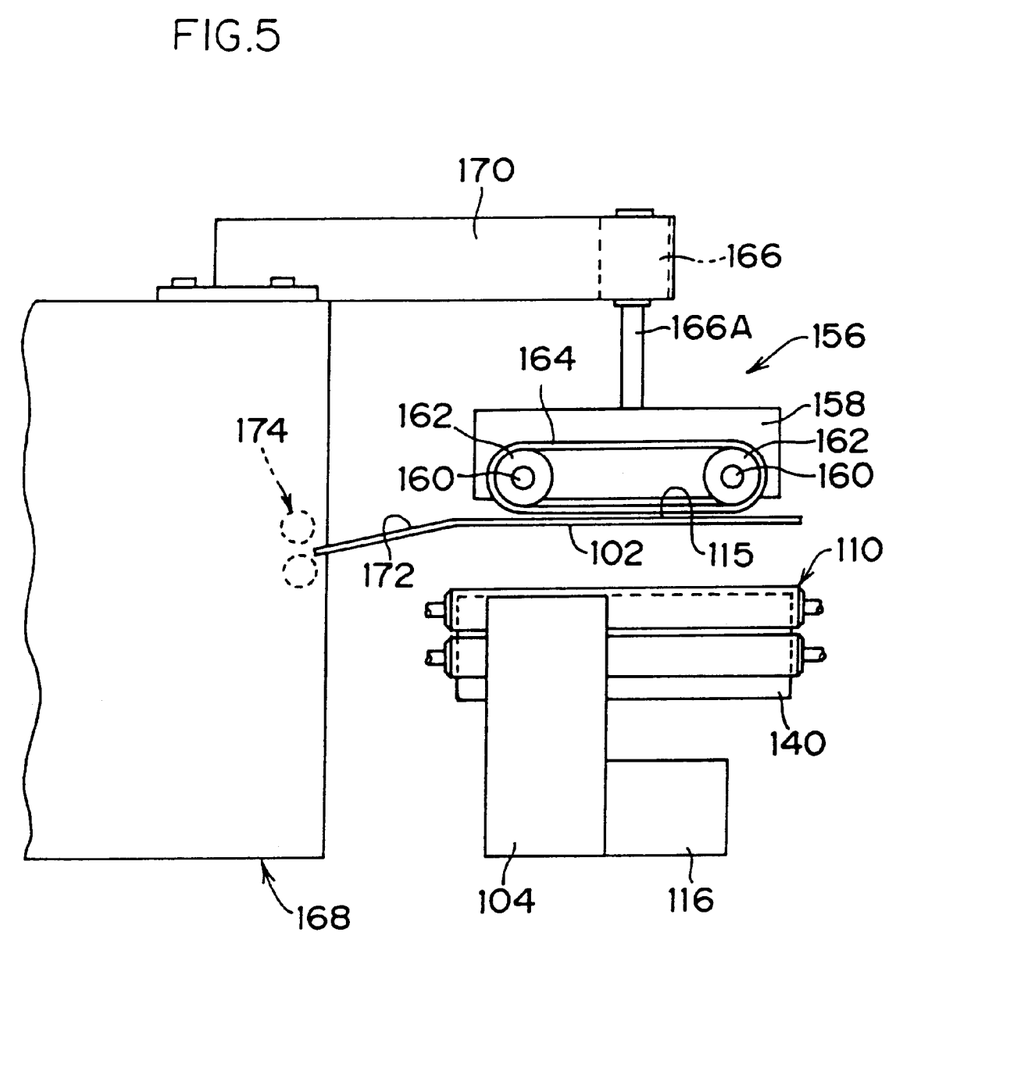
FIG. 5 is a schematic view showing a development processing guide section of the printer processor shown in FIG. 1.

As shown in FIG. 5, the development section tray 115 has a slope 172 in a direction orthogonal to the direction in which the printing paper 102 is transported and the distal end of the slope 172 corresponds to the insertion port of the development unit 168.

The direction changing section 156 is disposed above the development tray 115.

In the direction changing section 156, a body having a rectangular body 158 whose longitudinal direction corresponds to the transverse direction of the printing paper 102 is located at the middle thereof and drive shafts 160 protrude from both sides at both ends in the longitudinal direction of the body 158. Sprockets are mounted at the distal ends of the drive shafts 160 and endless belts 164 are entrained around the sets of rollers, one endless belt over one set of rollers on the same side of the body 158.

In the body 158, drive means (not shown) for driving and rotating the drive shafts are provided and can move the belt 164 in a predetermined direction.

A fore-end of an expanding/contracting rod 166A of a cylinder 166 is fixedly attached to the upper portion of the body 158. The cylinder 166 is fixed to a bracket 170 which extends from the developing section 168. Here, when the expanding/contracting rod 166A is in a retracted state, a gap which is larger than a thickness of the printing paper 102 is formed between the developing section tray 154 and the belt 164 and thereby the printing paper 102 which is discharged from the printing paper reversing section 148 is placed on a developing section tray 115.

When the expanding/contracting rod 166A is extended in this state, the belt 164 is caused to contact the upper surface of the printing paper 102 at a predetermined pressure (a very low pressure is preferred). Thereafter, the drive shaft 160 is driven and thereby the printing paper 102 can be transported and guided toward the slope 172.

Namely, the transport direction is changed to a direction (the transverse direction of the printing paper 102) which is orthogonal to the transportation direction in the printing paper reversing section 148.

The developing section 168 is provided with unillustrated processing tanks such as a developing tank, a fixing tank, a washing tank and the like and the printing paper 102 is transported while being immersed in the tanks by a plurality of development system transport roller pairs 174 to a drying section 176 which is the final section in the developing section 168.

In this case, in the present embodiment, since the printing paper 102 is transported in the transverse direction thereof, the length in the transporting direction of the developing section 168 is short. For example, the path length can be shortened by the difference in time required due to the change of transporting direction to the transverse direction of the printing paper 102 as compared with when conventional printing paper 102 is developed while being transported along its longitudinal direction. Therefore, the path length of the printing paper in the development section 168 in the present embodiment is shortened as compared to the conventional method, which contributes to the reduced size of the apparatus to a great extent.

A guide plate, unillustrated in FIG. 4, is provided between the developing system roller pairs 174 so that even the printing paper 102 which has a short transporting direction may enter the predetermined transport path with certainty.

Figure 6:
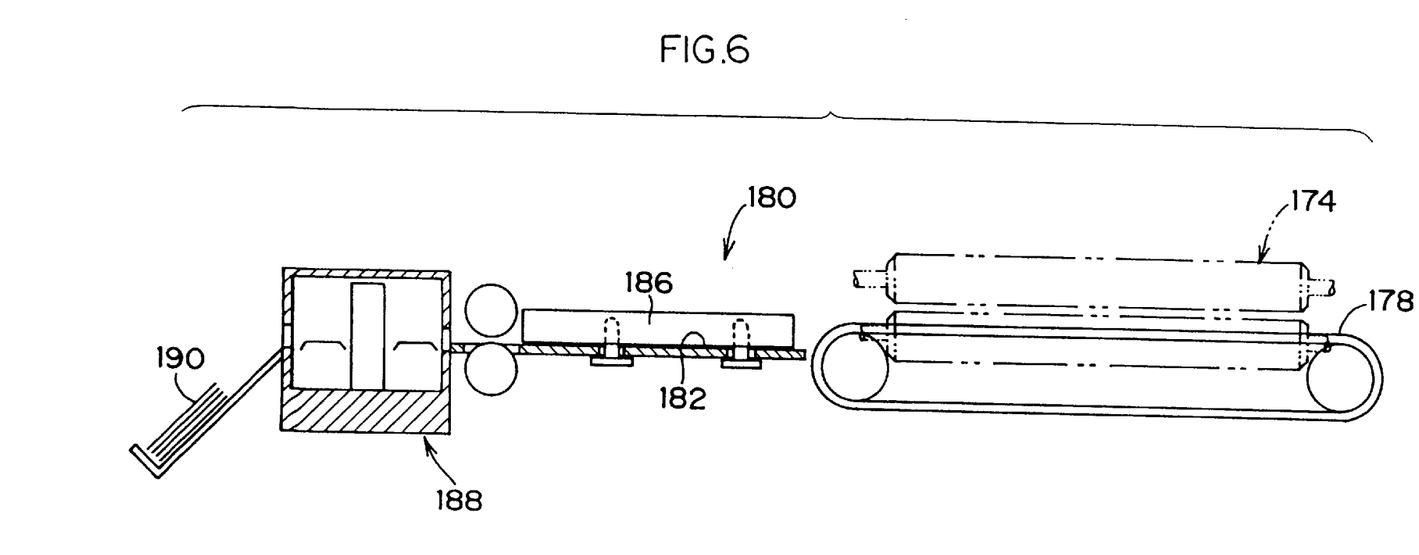
FIG. 6 is a schematic view showing a transport direction restoring/cutting section of the printer processor shown in FIG. 1.

As shown in FIG. 6, the printing paper 102 which has completed the drying step of the developing section 168 is discharged on a flat belt 178 which is entrained around a pair of rollers. When the printing paper 102 is discharged, the flat belt 178 is stopped, but can be transported by the driving force of an unillustrated driving means. After the printing paper 102 is placed thereon, the transporting starts and the printing paper 102 is transported to a transverse direction guiding section 180. At this point, the transporting direction is a direction orthogonal to the transporting direction in the developing section 168 and coincides with the transporting direction prior to the developing section 168. That is, the printing paper 102 is restored to its original transporting direction on the flat belt 178.

A base plate 182 having a fixed guiding plate 184 and a movable guiding plate 186 provided thereon are disposed in the transverse direction guiding section 180. The movable guiding plate 186 is provided so as to be able to come close to or move away from the fixed guiding plate 184 and can be positioned at a predetermined position according to the transverse dimension of the printing paper 102. Hence, the printing paper 102 which is transported from the flat belt 178 is corrected in its direction even if the printing paper 102 is placed in a direction oblique to the normal direction, and is transported in the normal direction to the cutter section 188.

A main cut mark sensor and a cutter are provided in the cutter section 188, and cut the printing paper 102 into single image area units. The printing paper 102 is discharged as a single completed photographic print 190.

The operation of the present embodiment will be described below.

When the magazine 104 is loaded in a predetermined position of the printer processor 100, the printer processor 100 recognizes the size of a printing paper accommodated in the magazine 104. In this case, marks, symbols, or a bar code expressing the size of the printing paper accommodated in the magazine 104 may be given to the paper, and these then read automatically by the printer processor 100, alternatively, the size of the printing paper may be written on the magazine which is then read by the operator and input via a keyboard or the like.

When the size of the printing paper 102 is recognized, the pair of magazine system transporting rollers 110 begins to be driven and the printing paper 102 is extracted from the magazine 104 and transported.

Pairs of exposure system transporting rollers 112 are provided on the downstream side and a predetermined looseness 102 is produced in the printing paper in the buffer section 114. With the looseness produced in the printing paper 102, when the printing paper 102 is transported at a constant speed during scanning exposure (sub-scanning movement), unevenness in the transporting speed of the printing paper 102 due to the generation of unnecessary tension therein caused by a shortage of the amount of paper extracted from the magazine 104 can be prevented from occurring.

When the printing paper 102 reaches the scanning exposure position of the exposure section 116, the image data is read in the exposure section 116. A laser beam whose output intensity is controlled based on the image data read is emitted from the laser unit 120 and guided to the emulsion side of the printing paper 102 via the optical system including the collimator lens 122, the polygon mirror 126, the f$^{\theta}$lens 130, and the like. At this point, while the laser beam moves back and forth along the main scanning direction, the printing paper 102 is transported at a constant speed, so that images can be recorded on the printing paper 102. Here, the orientation of the images is changed according to the size of the printing paper 102 used. In this case, the orientation of an image may be set according to the size of the printing paper 102 recognized in advance.

FIG. 3A shows the printing paper 102 with a width of 89 mm. This corresponds to the aforementioned paper size 1) and the main scanning direction is the longitudinal (the shorter side) direction of the printing paper 102. Hence, image data read is required to be rotated by 90 degrees.

FIG. 3B shows the printing paper 102 with a width of 127 mm. This corresponds to the aforementioned paper size 2) and the scanning direction is the lateral (the longer side) direction of the printing paper 102. Hence, image data read can be used as is.

Figure 3C:
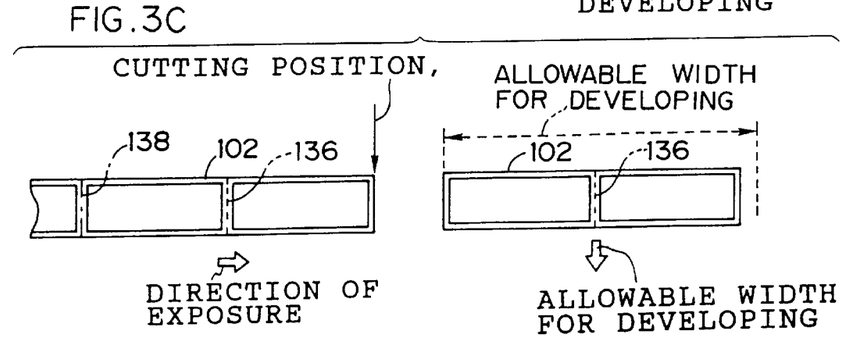

FIG. 3C shows the printing paper 102 on which a panorama size image is recorded. This corresponds to the aforementioned paper size 3) and the main scanning direction is the longitudinal (the shorter side) direction. Hence, image data read is required to be rotated by 90 degrees.

In the exposure section 116, main cut marks 136 and preliminary cut marks 138 are imparted to the printing paper 102 at the boundaries between each image area in addition to the boundaries between images. The main cut marks 136 are basically imparted to all boundaries between images except boundaries to which the preliminary cut marks 138 are imparted.

Boundaries between image areas are located differently according to the size of the printing paper 102. Therefore, a mark is imparted to the printing paper 102 after the position of the mark has been recognized on the basis of the paper size was previously recognized.

Preliminary cut marks 138 are set corresponding to a width at which one developing processing can be performed. Namely, in FIG. 3A after every 4 frames, in FIG. 3B after every 5 frames, and in FIG. 3C after every 2 frames.

The printing paper 102 to which main cut marks 136 and preliminary cut marks 138 have been imparted is transported through the detection unit 140.

In the detection unit 140, the preliminary cut marks 138 are detected by the preliminary cut mark sensor 144. The printing paper 102 is continuously transported from the time of the detection of a mark at a predetermined constant speed and the point in time when the cutter 146 is to be activated can be recognized based on the constant transport speed and the distance (offset amount) to the cutting position of the cutter 146 in the cutter unit 144. In other words, when a preliminary cut mark is detected by the detection unit 140, the cutter 146 is activated after a predetermined length of time has elapsed to cut the printing paper 102.

The cut printing paper 102 which has a plurality of frames is guided between a pair of guiding plates 150 of the printing paper reversing section 148 and the printing paper 102 is subjected to a directional change of 180 degrees by the reversing system transport roller pair 152 and further travels onto the development tray 154.

The direction changing section 156 is in standby mode above the developing tray 154. Namely, the expanding and contracting rod 166A of a cylinder 166 is in a retracted state and a gap is produced between the belt 164 and the development tray 154. The printing paper 102 discharged from the printing paper reversing section 148 is inserted into this gap.

After the printing paper 102 is placed on the development tray 154 under the belt 164 of the direction changing section 156, the belt 164 begins to be driven and sends the printing paper 102 onto the slope 172 which is connected with the development tray 154.

The printing paper 102 which has been sent out onto the slope 172 comes into the development section 168, guided by the development system transport roller pairs 174 and unillustrated guide plates, where developing, fixing, washing, and drying processes are carried out.

The allowable width for developing in the developing section 168 is determined by the size of the processing tanks (storing developing agent, fixing agent, and the like) and in the present embodiment, the printing paper 102 is cut according to the allowable width and the allowable width is exploited to the full extent. Hence, the total area of the printing paper 102 in the present embodiment is increased corresponding to the difference due to the full exploitation of the allowable width as compared with when the printing paper 102 is treated while being transported in its longitudinal direction, provided that the time in which the processings are effected is equal in both cases. In other words, if the total areas to be treated in both cases are the same as each other, the processing time is reduced in the present embodiment and therefore, processing tanks can be smaller in size, which contributes to reducing the size of the apparatus.

The printing paper 102 which has completed the processings in the development section 168 is then discharged onto the flat belt 178. The flat belt 178 begins to be activated when placement of the printing paper 102 thereon is recognized and sends out the printing paper 102 to the transverse direction guiding section 180.

In the transverse direction guiding section 180, the movable guide plates are moved according to the size of the printing paper 102 and set so as to provide a specific interval between the movable and fixed guide plates. Hence, the printing paper 102 which has been sent from the flat belt 178 passes between the fixed guide plate 184 and the movable guide plate 186, by which the printing paper 102 is corrected to a predetermined position.

Thereafter, in the cutter section 188, main cut marks 136 are detected and cutting at all the main cut mark 136 positions is performed, whereby photographic prints 190 are completed.

In this way, in the present embodiment, the orientation of the printing paper 102 is changed in the course of transportation, that is exposure is performed while the printing paper 102 is being transported in its longitudinal direction, thereafter the orientation of the printing paper 102 is changed, development is performed, and the direction in which the printing paper 102 is transported is restored to the longitudinal direction of the printing paper 102. Hence, the degree of freedom in designing can be increased and the space for installing the apparatus can also be saved as compared with an apparatus in which all processings are performed while transporting the printing paper along one direction thereof as in the a conventional technique.

Since the printing paper 102 is cut into pieces, each including a plurality of frames, and developing processing is performed, while the printing paper 102 is being transported in the transverse direction thereof, the processing capacity per time unit can be increased corresponding to the increased width as compared with conventional development in which the printing paper is transported in the longitudinal direction thereof. In other words, in order to obtain a predetermined processing capacity, the processing time can be shortened and downsizing of tanks for developing, fixing, washing, and the like can be realized. As a result, downsizing of the entire apparatus can also be a realized.

In the present embodiment, while a scanning exposure system is employed in the exposure section 116, however, a conventional full-image exposure may be employed for print exposure.

In the present embodiment, while the print size of the entire printing paper 102 is uniform, cutting into a plurality of image frames according to preliminary cut marks is possible even when a photographic film which is a mixture of L size and panorama size is used.

Figure 7A:
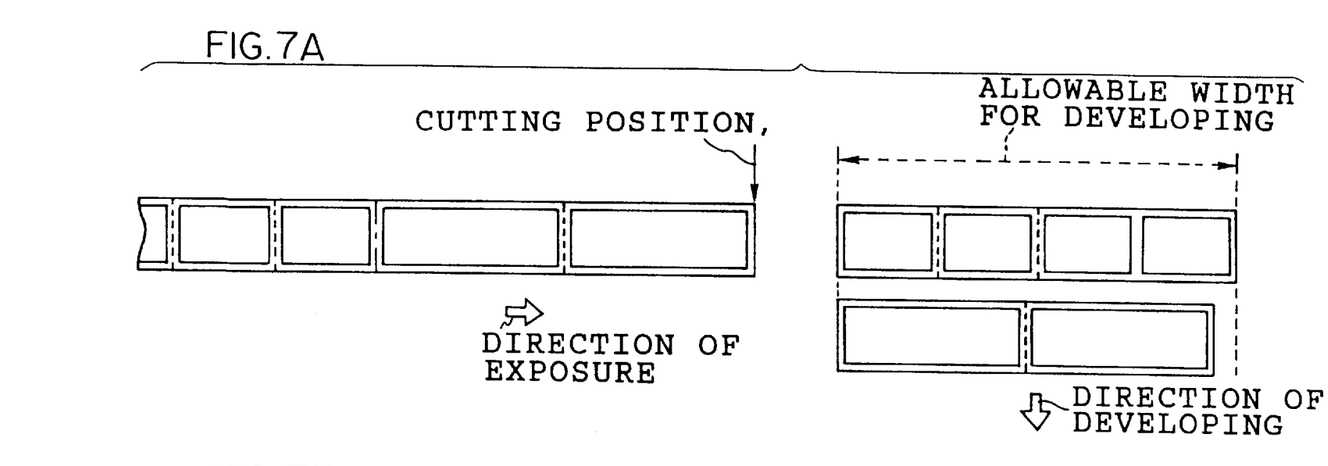
FIGS. 7A and 7B are plan views showing states where printing paper is transported according to a modified example.

Namely, FIG. 7A shows an example in which a sequence of exposure is in the order of P→P→L→L→P→L. In this case, since a combination of the aforementioned printing paper sizes 1) and 3) is employed, it is only required that a preliminary cut mark 138 be provided after the second panorama size image and a preliminary cut mark 138 be again provided after the third panorama size image.

Figure 7B:
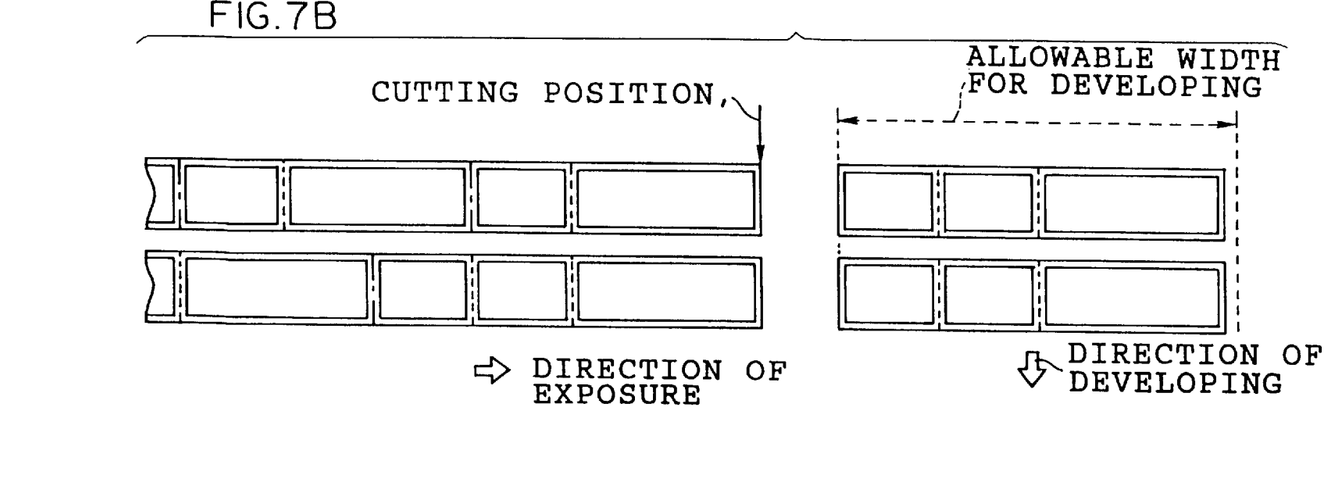

FIG. 7B applies in the case where a scanning exposure system is employed as in the present embodiment. When two types of image sizes are alternated in a sequence of exposure which goes L→P→L→P, the order of storage of images is changed to an order in which predetermined patterns or images of a single size are collectively recorded. Namely, in the example shown in FIG. 7B, an order of image recording is adopted so as to assume a predetermined pattern (a predetermined combination of L and P).

In the preferred embodiments, the area produced after cutting the preliminary cut mark 138 is described as a plurality of image areas. However, it may be a single image area. Further, in the preferred embodiments, the detection unit 140 and cutter unit 144 are disposed at a downward side of the exposure portion 116. However, they may be disposed at an upward side of the exposure portion 116 so as to effect exposure after cutting the photosensitive material.

As has been explained above, the first to third aspects of the present invention show an excellent effect in that the length of the developing path can be shortened and the size of the apparatus can be reduced without reducing the processing capacity.

What is claimed is:

1. A photographic processing method for obtaining photographic prints by sequentially exposing predetermined images onto an elongated photosensitive material and performing developing processing on said photosensitive material, comprising the steps of:
   (a) exposing said photosensitive material by conveying said photosensitive material in a longitudinal direction with said photosensitive material oriented in a first orientation having a first leading edge;
   (b) prior to the time of developing processing, cutting said photosensitive material into a per image area unit length; and
   (c) transporting said photosensitive material into a developing section by conveying said photosensitive material in a transverse direction with said photosensitive material oriented in a second orientation having a second leading edge which is transverse to said first leading edge.

2. A photographic processing method according to claim 1, wherein said image area unit is a single image unit.

3. A photographic processing method according to claim 1, wherein said image area unit is a plurality of image units.

4. A photographic processing method according to claim 1, wherein cutting of a photosensitive material into said image area units is conducted prior to exposure.

5. A photographic processing method according to claim 1, wherein cutting of a photosensitive material into said image area units is conducted after exposure.

6. The photographic processing method according to claim 1, wherein the per image area unit length is determined according to a width of an opening slot of a developing section.

7. A photographic processing method for obtaining photographic prints by sequentially exposing a predetermined image onto an elongated photosensitive material, performing developing processing on said photo sensitive material, and then cutting said photosensitive material after each image on the basis of main cut marks provided at the boundaries of exposure areas wherein:
   said photosensitive material is exposed while being transported in an elongated state in the longitudinal direction of said photosensitive material;
   at the time of said exposure, preliminary cut marks are imparted to the boundaries of image areas in such a way that the image exposure area is kept inside a predetermined length in the longitudinal direction of said photosensitive material, with the length of the exposed image area in the direction in which the photosensitive material is transported taken as one unit;
   said exposed photosensitive material is cut at each of said preliminary cut marks;
   the direction in which said cut photosensitive material is being transported is changed to the transverse direction of said cut photosensitive material and developing processing is performed on said cut photosensitive material while said cut photosensitive material is being transported in this state;
   and said processed photosensitive material is then cut at each main cut mark.

8. A print processor for obtaining photographic prints by sequentially exposing a predetermined image onto an elongated photosensitive material, performing developing processing on said photosensitive material, and then cutting said photosensitive material after each image on the basis of main cut marks provided at the boundaries of exposure areas between image exposures comprising:
   preliminary cut mark imparting means for imparting preliminary cut marks to the boundaries of image areas, at the time the image is exposed onto the photosensitive material, in such a way that the image exposure area is kept inside a predetermined length in the longitudinal direction, with the length of the exposed image area in the direction in which the photosensitive material is transported taken as one unit;
   preliminary cut mark detecting means for detecting, on a photosensitive material having completed image exposure, preliminary cut marks imparted by said preliminary cut mark imparting means;
   cutting means for cutting said photosensitive material in a location where said preliminary cut marks have been detected by said preliminary cut mark detecting means;
   direction changing means for changing the direction in which said photosensitive material is being transported to the transverse direction of said photosensitive material after said photosensitive material has been cut by said cutting means;
   and a developing processing section for performing developing processing on said photosensitive material while transporting said photosensitive material in the direction set by said direction changing means.

\* \* \* \* \*